May 16, 1944.  J. PERRICONE  2,348,923
VEHICLE RECORDER
Filed May 27, 1941  2 Sheets-Sheet 1
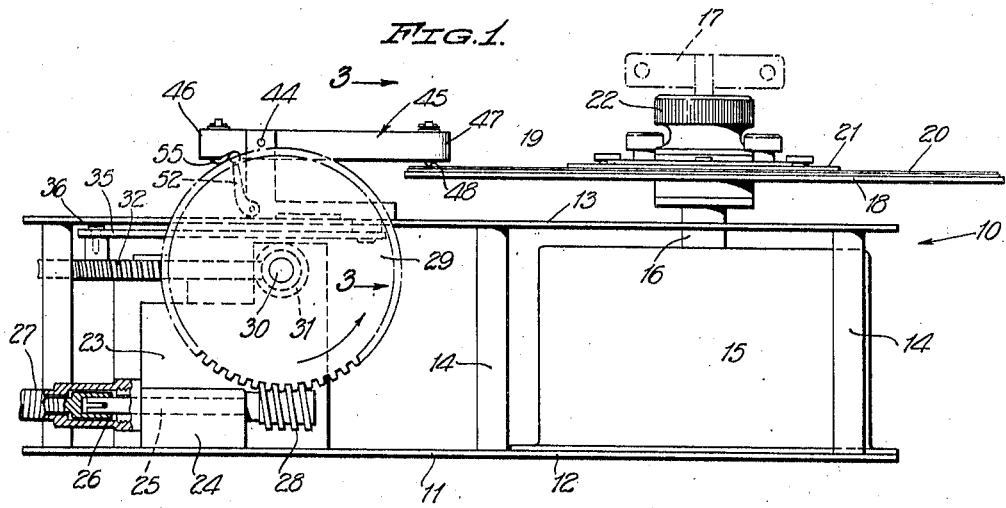
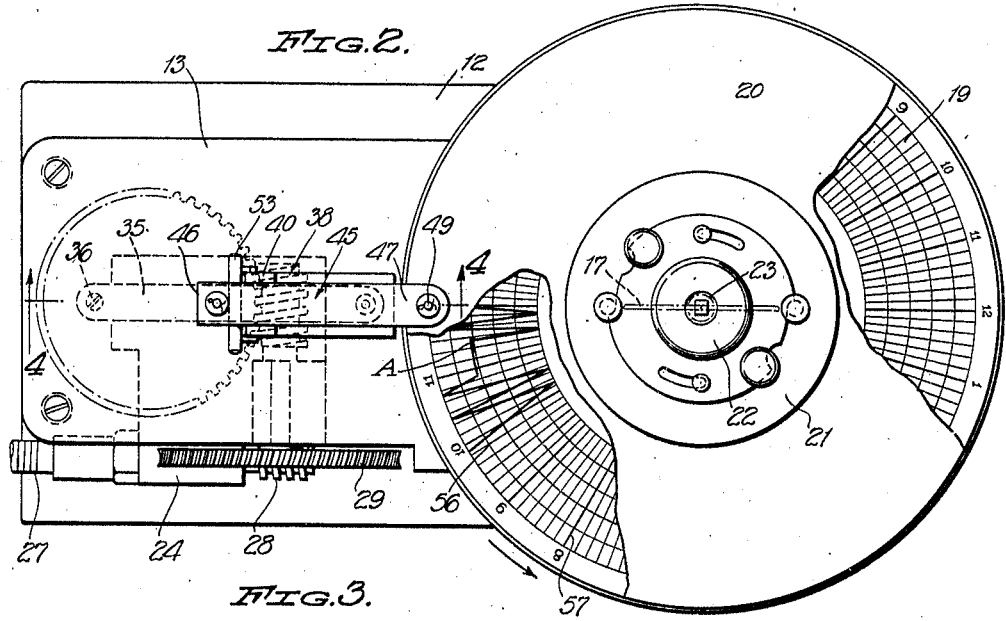
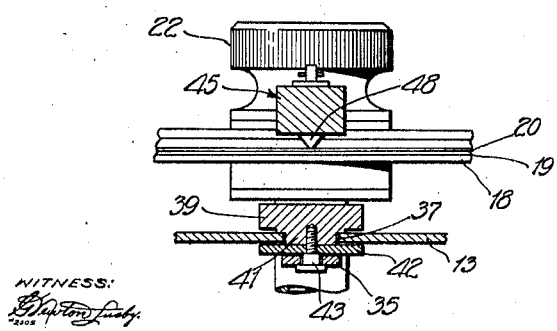
JOSEPH PERRICONE,
INVENTOR.
BY Ely & Pattison
ATTORNEYS.

May 16, 1944.  J. PERRICONE  2,348,923
VEHICLE RECORDER
Filed May 27, 1941   2 Sheets-Sheet 2
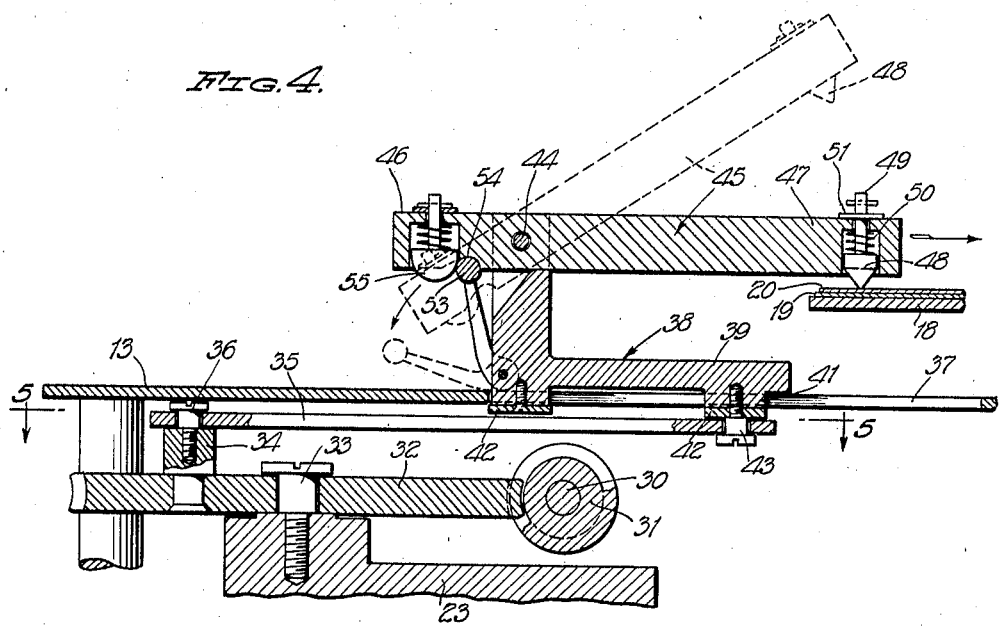
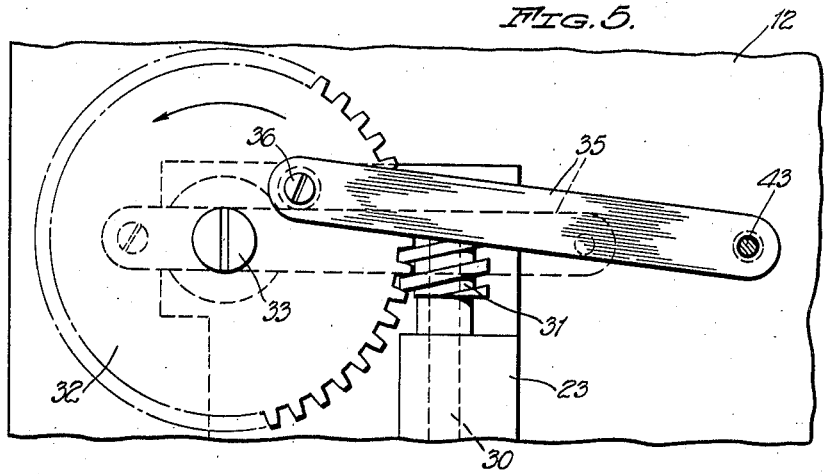
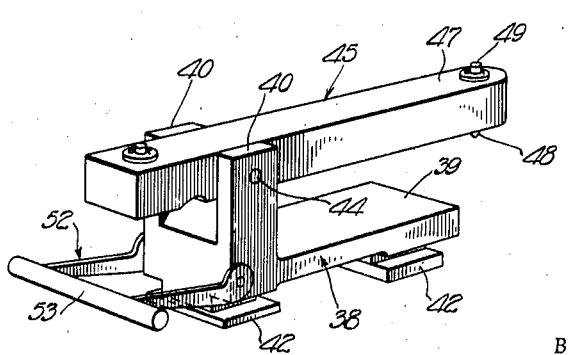
JOSEPH PERRICONE,
INVENTOR.
BY Ely & Pattison
ATTORNEYS.

Patented May 16, 1944

2,348,923

UNITED STATES PATENT OFFICE 2,348,923

VEHICLE RECORDER

Joseph Perricone, Brooklyn, N. Y.

Application May 27, 1941, Serial No. 395,349

2 Claims. (Cl. 234—70)

This invention relates to improvements in recorders, and more specifically to a mileage and time recorder device for use upon motor vehicles.

The primary object of the invention resides in a device for installation upon motor trucks or other motor vehicles driven by truckmen, chauffeurs, and other employees, by which the owner of a truck or other motor vehicle on which the device is installed, may know at the end of a day to what extent the motor vehicle has been idle and the time thereof, also, the total number of miles traveled, and the speed of travel over periods of time.

Another feature of the invention is to provide a recorder device which produces a permanent chart of the mileage and time of travel of a motor vehicle and which charts may be filed by the owner of a fleet of trucks on which the devices are installed as permanent records to check the honesty and efficiency of the driver-employees.

A further feature of the invention is the provision of a mileage and time recorder device for motor vehicles which is relatively simple and inexpensive in construction, and positive of operation to produce accurate chart recordings.

Other features of the invention will become apparent as the following specification is read in conjunction with the accompanying drawings, in which:

Figure 1 is a side elevational view of the time and mileage recorder device with the parts in operative relation, Figure 2 is a top plan view with a portion of the carbon paper disk broken away.

Figure 3 is an enlarged detail vertical transverse sectional view on the line 3—3 of Figure 1.

Figure 4 is an enlarged detail vertical longitudinal sectional view on the line 4—4 of Figure 2, the stylus arm being illustrated in unlocked raised position in dotted lines.

Figure 5 is a horizontal sectional view on the line 5—5 of Figure 4, but illustrating the stylus actuating mechanism in a position as nearing the limit of inward movement of the stylus.

Figure 6 is a detail perspective view of the stylus and its carriage per se.

Referring to the drawings by reference characters, the numeral 10 designates the mileage and time recorder device in its entirety and which includes a frame structure 11 which comprises a flat rectangular base plate 12, a similar top plate 13 held spaced from the base plate 12 by vertical posts 14. Fixedly secured to the base plate 12 is a clock mechanism 15 which includes an arbor 16 which makes one complete revolution within each twenty-four hours' time. The clock mechanism 15 is spring actuated, and passing through the arbor 16 is the winding shaft to which a key 17 may be connected to facilitate the winding of the spring. The arbor 16 extends above the top plate 13 and has a metal disk or turntable 18 fixedly secured thereto. The turntable receives the circular chart 19 on which graphic markings are recorded, and a detailed description of the chart 19 will be set forth hereinafter. Positioned over the chart 19 is a circular sheet of carbon paper 20, the carbon side being face down against the upper face of the chart 19. The carbon paper sheet and the chart are removably secured against the turntable for rotation therewith by a clamping disk 21 of any conventional construction and which includes an upstanding knob 22 which is provided with a central opening 23 for the passage of the winding key 17. Any conventional means may be employed for removably securing the clamping plate to the turntable for rotation therewith.

Fixed to the base plate 12 is a block 23 having a bearing 24 in which a drive shaft 25 is rotatably mounted. The axis of the shaft 25 is at a right angle to the axis of the arbor 16 of the clock mechanism, and its outer end is provided with a coupling 26 by which the drive shaft is connected to a flexible shaft 27, said shaft 27 being preferably driven by the speedometer gear of the transmission of a motor vehicle. Thus it will be seen that during the travel of a motor vehicle, the flexible shaft 27 will be rotated and such rotation imparted to the drive shaft 25. The inner end of the drive shaft 25 has a worm 28 fixed thereto which is in constant mesh with a relatively large companion gear 29, the latter being fixed to a shaft 30 journaled in the block 23 and disposed at right angle to the axis of the drive shaft 25. Also fixed to the shaft 30 is a worm 31 which has constant mesh with a relatively large companion gear 32, the same being horizontally disposed and rotatably mounted on a screw pin 33 threaded into the top of the block 23. From the description thus far, it will be seen that as the drive shaft 25 is rotated at a relatively high rate of speed, a speed reduction is obtained between the worm 28 and the driven gear 32, whereby the latter gear rotates at a relatively slow speed. Fixed to the gear 32 is an eccentric pin 34, the same rising upwardly from the top face of the gear and to which one end of a link 35 is connected by means of a screw pin 36, the latter being threaded into the pin 34.

The top plate 13 is provided with an elongated slot 37, the same extending lengthwise of the plate and being disposed adjacent the block 23. The slot 37 acts as a guide for a carriage member 38 which comprises a horizontal base 39 and a pair of opposed upstanding ears 40—40. Integral with the base 39 and depending from the underside thereof are guide lugs 41 which are disposed in the slot 37. Plates 42 are secured to the lugs 41 and which plates transversely bridge the slot 37 to underlie adjacent portions of the top plate 13. As previously mentioned, one end of the link 35 is connected to the pin 36 while the other end is connected to a wrist pin 43 which is threaded into the inner guide lug 41 and which wrist pin also acts to secure that particular plate 42 which is connected to the said lug. The relative length of the slot 37 as compared to the length of the carriage member 38 is such as to permit reciprocation of the carriage member as the eccentric pin 34 turns about the axis of the gear 32.

Pivoted at 44 between the ears 40—40 is a stylus arm 45 which includes a relatively short tail end 46 and a relatively long head end 47, the latter extending over the turn table 18 when the stylus arm is in operative position as illustrated in full lines. Slidably mounted in the head end 47 of the arm 45 is a stylus in the form of a pointed pin 48, the same having an upstanding shank 49 slidably mounted in the head end of the arm. A spring 50 acts upon the stylus pin 48 to move the same outwardly, such outward movement being limited by a washer 51 attached to the upper end of the shank 49. For locking the stylus arm 45 in a horizontal operative position, there is provided a U-shaped latch member 52, the side arm of the latch member being pivoted to opposite sides of the carriage 38 at the outer end thereof while the bight portion of the latch member consists of a bar 53 which is round in cross section. When the latch member 52 is swung upwardly to locking position, the bar 53 enters a notch 54 in the underside of the tail portion 46 of the stylus arm. In order to seat the bar 53 in the notch, the bar must pass a spring actuated locking pin 55 mounted in the tail portion 46. The rounded head of the locking pin engages behind the bar 53 to prevent accidental unseating of the bar 53 from the notch 54, although the latch member 52 may be manually moved down by forcing the bar 53 past the rounded head of the locking pin 55.

The circular chart 19 hereinbefore mentioned consists of a disk of paper having a series of equidistantly spaced circumferential lines 56 printed thereon, there being six of such lines shown, and the distance between adjacent lines is representative of one mile. The distance between the outermost line 56 and the innermost constitutes the extreme limits of movement of the stylus 48 during its reciprocating movement. The circumferential indicating lines 56 are intersected by equidistantly spaced radial lines 57, the latter being indicative of time intervals. In view of the fact that the arbor of the clock mechanism 15 travels one complete revolution in twenty four hours, the chart 19 has two series of time indicating lines, one series extending one hundred eighty degrees about the chart being representative of a. m., and the other series being indicative of p. m. The hour indicating lines 57 are identified by hour numerals.

In the operation of the time and mileage recorder 10, it will be seen that as the drive shaft 25 rotates by reason of its connection with the speedometer gear of the transmission of a motor vehicle or any other rotating driving part operable during travel of the motor vehicle, that the rotary movement is transmitted through the worm 28, gear 29, shaft 30, to the worm 31, thence to the driven gear 32. This gearing constitutes a speed reducer, thus the gear 32 rotates at a relatively slow speed, but as it rotates, the eccentric pin 34 actuates the link 35 to cause the carriage 38 to slowly move back and forth along the length of the slot 37. Assume that the stylus pin 48 is in contact with the carbon sheet 20 under the slight pressure of the spring 52, it will be seen that the stylus through the medium of the carbon sheet will impart graphic marking designated A in Figure 2 to the chart 19. So long as the motor vehicle on which the device is installed is in motion, a zig-zag marking will appear on the chart, but should the motor vehicle stop for any appreciable length of time, there will be no drive to the drive shaft 25, thus the stylus 48 remains stationary, although the turn table is rotated by means of the clock mechanism, thus a circumferential arcuate mark will appear on the chart. By comparing this arcuate marking with the time indicating lines, the time of stoppage of the motor vehicle may be determined. Also, by comparing the zig-zag graphic markings with the radial time indicating lines 57, the approximate rate of speed of travel of the motor vehicle may be determined.

In practice, the entire device 10 is enclosed in a tamper-proof casing, so that the recorder is only accessible to authorized persons. The recorder may be installed on motor trucks by the owners thereof to check the drivers after a day's run of the truck.

When changing charts 19, the stylus arm 47 is swung to an out of the way position as indicated in dotted lines in Figure 4, the latch which holds the stylus arm in horizontal position having been released.

While I have shown and described what I consider to be the most practical embodiment of my invention I wish it to be understood that such changes in construction and design as come within the scope of the appended claims may be resorted to if desired.

Having thus described the invention, what I claim as new and desire to secure by Letters Patent of the United States, is:

1. In a recorder device, a frame structure including a horizontal table, a carriage comprising a base and an upstanding bearing, means for slidably connecting said base to said table, a stylus arm pivotally mounted on said bearing intermediate its ends, stop means on said bearing for limiting the swinging movement of the stylus arm toward said table, a latch member pivoted to said carriage and disposed beneath said stylus arm for upward swinging movement into engagement therewith, a yieldable keeper member carried by said stylus arm with which the latch member engages to lock said stylus arm against swinging movement in a direction away from said table, and means for imparting reciprocating movement to said carriage.

2. In a recorder device, a table, a carriage comprising a base and an upstanding bearing, means for slidably connecting said base to said table, a stylus arm pivotally mounted on said bearing, a latch member pivoted to said carriage and disposed beneath said stylus arm for upward swinging movement into engagement therewith, a keeper member carried by said stylus arm with which the latch member engages to lock said stylus arm against swinging movement in a direction away from said table, and means for imparting reciprocating movement to said carriage.

JOSEPH PERRICONE.